United States Patent [19]

Mahlein

[11] Patent Number: 4,744,618

[45] Date of Patent: May 17, 1988

[54] OPTICAL DEVICE FOR USE AS A MULTIPLEXER OR DEMULTIPLEXER IN ACCORDANCE WITH THE DIFFRACTION GRATING PRINCIPLE

[75] Inventor: Hans F. Mahlein, Unterhaching, Fed. Rep. of Germany

[73] Assignee: Siemens Aktiengesellschaft, Berlin and Munich, Fed. Rep. of Germany

[21] Appl. No.: 481,357

[22] Filed: Apr. 1, 1983

[30] Foreign Application Priority Data

May 3, 1982 [DE] Fed. Rep. of Germany ....... 3216516

[51] Int. Cl.[4] ............................ G02B 6/34; H04B 9/00
[52] U.S. Cl. ............................... 350/96.19; 350/96.15; 350/96.16; 350/162.20; 370/3
[58] Field of Search ................ 350/96.1, 96.15, 96.16, 350/96.18, 96.19, 96.20, 162.17, 162.19, 162.20, 162.22, 162.23; 370/1, 2, 3; 356/326, 328, 331, 332, 333, 334

[56] References Cited

U.S. PATENT DOCUMENTS

| | | | |
|---|---|---|---|
| 3,883,223 | 5/1975 | Hudson | 350/96.18 |
| 4,021,099 | 5/1977 | Kawasaki et al. | 350/96.18 |
| 4,111,524 | 9/1978 | Tomlinson, III | 350/96.19 |
| 4,198,117 | 4/1980 | Kobayashi | 350/96.19 |
| 4,274,706 | 6/1981 | Tangonan | 350/96.19 |
| 4,278,322 | 7/1981 | Mahlein | 350/96.16 |
| 4,329,017 | 5/1982 | Kapany et al. | 350/96.19 |
| 4,343,532 | 8/1982 | Palmer | 350/96.19 |
| 4,622,662 | 11/1986 | Laude et al. | 370/3 |
| 4,643,519 | 2/1987 | Bussard et al. | 350/96.19 |
| 4,652,080 | 3/1987 | Carter et al. | 350/96.19 |
| 4,675,860 | 6/1987 | Laude et al. | 370/3 |

FOREIGN PATENT DOCUMENTS

| | | |
|---|---|---|
| 282802 | 1/1980 | Fed. Rep. of Germany . |
| 55-6323 | 1/1980 | Japan ................ 350/96.18 |
| 55-35330 | 3/1980 | Japan ................ 350/96.19 |
| 55-105211 | 8/1980 | Japan ................ 350/96.19 |
| 56-155901 | 12/1980 | Japan ................ 350/96.19 |

OTHER PUBLICATIONS

Dianov et al., "Spectral Channel . . . Waveguide", Sov. J. of Quant. Elect. 11(2), Feb./81, pp. 229-231.

Aoyama et al., "Optical Demultiplexer . . . System", Applied Optics, vol. 18, No. 8, 4/79, pp. 1253-1258.
Yen et al, "Planar Rowland . . . Demultiplexing", Optics Letters, vol. 6, No. 12, pp. 639-641.
Aagard, "Design and Fabrication . . . Optical Waveguides", Optics Letters, vol. 1, No. 2, 8/77, pp. 67-69.
Soares, "Self-Imaging Devices . . . Communications", S.P.I.E., vol. 213, Optics and Photonics 1979, pp. 40-43.
Watanabe et al "Optical Demultiplexer Using Concave Grating in 0.7-0.9 μm Wavelength Region", *Electronics Letters*, Jan. 31, 1980, vol. 16, No. 3, pp. 106-108.
Watanabe et al "Optical Grating Multiplexer in the 1.1-1.5 μm Wavelength Region", *Electronics Letters*, Jan. 31, 1980, vol. 16, No, 3, pp. 108-109.
Laude et al "Un Multiplexeur-Demultiplexeur De Longueur D'Onde A Reseau (Configuration "Stimax")", Opto, No. 3, 1981, pp. 33-34.
Kobayashi et al "Microoptic Grating Multiplexers and Optical Isolation for Fiber-Optic Communications", *IEEE Journal of Quantum Electronics*, vol. QE-16, No. 1, Jan. 1980, pp. 11-12.
M. I. Belovolov et al "Optical Demultiplexer with a Glass Slide", *Third Intern. Conf. on Integr. Optics and Optical Fiber and Communication*, San Francisco, 1981, Paper TUH2.

*Primary Examiner*—William L. Sikes
*Assistant Examiner*—Brian M. Healy
*Attorney, Agent, or Firm*—Hill, Van Santen, Steadman & Simpson

[57] ABSTRACT

An optical device for use either as a waveguide demultiplexer or a waveguide multiplexer characterized by a compact transparent member having a surface forming optical means such as an imaging mirror, an opposite surface portion having a diffraction grating formed thereon and first and second coupling surfaces so that light can be coupled into the member reflected by the mirror and the diffraction grating and then coupled out of the member. The device has various embodiments with different structures for the optical mirror and the transparent member, with the structure of the coupling surfaces being flat or curved, and with either flat or curved additional mirrors for reflecting the incoming and outgoing light adjacent to the coupling surfaces.

36 Claims, 2 Drawing Sheets

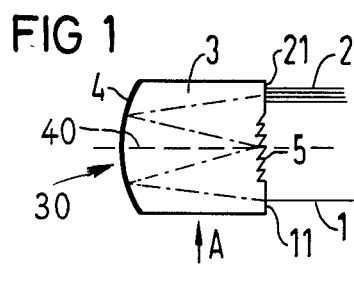
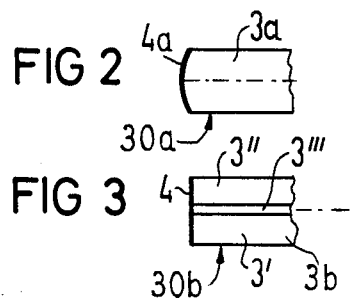
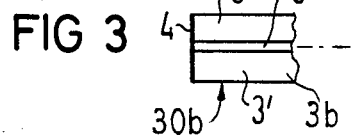
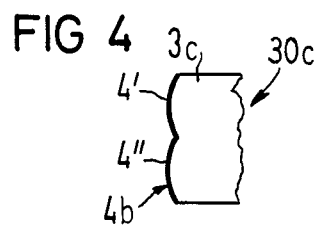
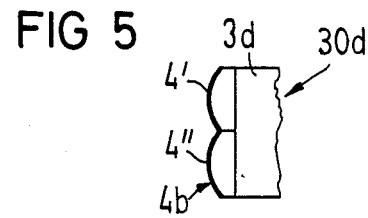
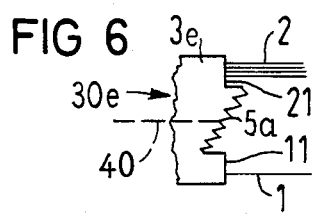
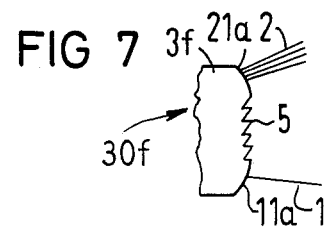
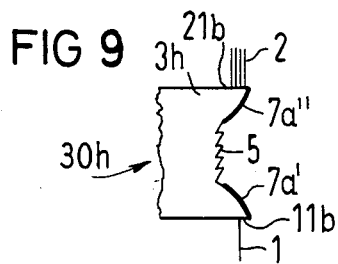
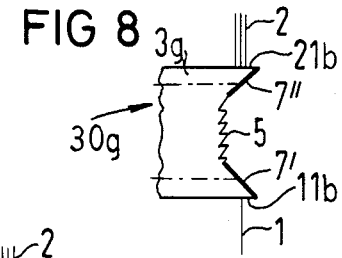
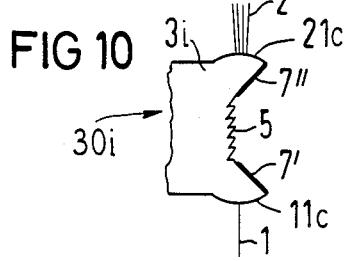

OPTICAL DEVICE FOR USE AS A MULTIPLEXER OR DEMULTIPLEXER IN ACCORDANCE WITH THE DIFFRACTION GRATING PRINCIPLE

BACKGROUND OF THE INVENTION

The present invention is directed to an optical device which may be used as an optical waveguide demultiplexer according to the diffraction grating principle or as an optical waveguide multiplexer. The optical device has a diffraction grating, optical means such as a reflecting mirror and first and second coupling surfaces which are provided in spatially separated image spaces of the mirror.

In optical wave demultiplexers having diffraction grating, an optical means for forming imaging optics and first and second coupling surfaces is disclosed, for example, in an article in *Electron. Lett.*, Vol. 16, 1980, page 108.

From the literature, a series of waveguide demultiplexer components are already known which employ plane diffraction gratings in conjunction with a concave mirror or a lens or which use a concave diffraction grating. In contrast to plane gratings, concave gratings are complicated to manufacture.

Compact structures with concave mirrors are known for example, from an article by Belovolov et al, *Third Intern. Conf. Integr. Opt. and Opt. Fiber Commun.*, San Francisco, 1981, Paper TUH2 and from an article by Laude et al, *Opto*, No. 3, 1981, p. 33. In these devices, the one or more incoming optical waveguides and the outgoing optical waveguides which waveguides may be optical glass fibers are closely spaced together and thus mutual adjustment is rendered more difficult. The same applies to gradient lens arrangements such as disclosed in an article by Kobayashi et al, *Quant. Electr.* QE-16, 1980, p. 11. Picture or illustration 6 of this article by Kobayashi clearly shows that the minimum spacing between an incoming fiber and an outgoing fiber will amount to approximately 50μ. In the case of translation or movement of the outgoing fibers, for example, which movement is necessary for an adjustment purpose, it is expected that the incoming fiber will also be inadvertently displaced.

In the construction according to the article by Laude et al in *Opto*, a bipartite grating or grating with an opening in the center was utilized. Such a construction is not desirable.

In an article by Watanabe et al, *Electron. Lett.*, Vol. 16, 1980, p. 108, an arrangement which has the incoming fiber and the outgoing fibers being spatially separated is disclosed. However, the construction of this device is not very compact.

SUMMARY OF THE INVENTION

The present invention is directed to providing an optical device, which operates with a diffraction grating principle and is used as either a demultiplexer for a band of light having different wavelengths or is used as a multiplexer for forming a band of light with different wavelengths out of separate beams of individual wavelengths, is compactly constructed and simple to manufacture.

To accomplish these objects, the present invention is directed to an improvement in an optical device selectively operated according to the diffraction grating principle as either a wavelength demultiplexer to separate light of different wavelengths into separate bands or as a wavelength multiplexer to multiplex light of different wavelengths into a single band, said device including optical means for forming imaging optics, a first coupling surface being provided in an object space of the optical means for coupling to a first optical waveguide, a second coupling surface being provided in an image space of the optical means and spatially separated from the first coupling space, said second coupling surface being coupled to a group of second optical waveguides, and a diffraction grating being arranged in the path of light traveling between the first and second coupling surfaces, said diffraction grating being arranged so that if the optical device is a demultiplexer, light containing more than one wavelength entering at the first coupling surface strikes the diffraction grating which has reflection maximas for various wavelengths of the light which maximas are outside of the zero order of diffraction of the grating and are located at the group of second waveguides of the second coupling surface and if operated as a multiplexer, light beams of different wavelengths are joined together as a single light beam of more than one wavelength. The improvement comprises a compact transparent member having a surface forming the optical means comprising at least one imaging mirror with an optical axis, said member having other surfaces forming the first and second coupling surfaces and another surface portion having the diffraction grating formed or provided thereon.

The compact transparent member may be composed of a single member or composed of a plurality of members. For example, in one embodiment the grating is embossed or pressed into a glass body which is then cemented to another glass body containing the other structural features of the device. In another embodiment, the mirrors are formed on separate glass bodies which are then cemented to the glass body containing the coupling surfaces and diffraction grating. Finally, the body can be composed of two glass members and have a waveguide layer which is either a thin glass plate of a higher index of refraction than the index of refraction of the glass members sandwiched therebetween or is a layer on one of the glass members which has been provided with a higher index of refraction due to an ion exchange.

The diffraction grating is preferably a blazed grating which is formed by a blazed-in-technique and is positioned to be inclined relative to the optical axis of the imaging optics. While it may be formed in a surface of the member or portion thereof such as by hot-pressing in glass, it can also be a replica grating or a silicon grating which has been secured on a surface portion of the member.

Preferably, the diffraction grating is arranged on one side of the member with the optical means such as a concavely curved mirror being arranged on an opposite side of the member and the coupling surfaces are arranged adjacent to the diffraction grating either on that surface or on the surfaces closely adjacent thereto with the diffraction grating being disposed therebetween. The mirror of the optical means may be a single cylindrically concave mirror or two cylindrical concave mirrors. In addition, the mirror may be a doubly curved mirror which is either selected from a group consisting of spherical and aspherically curved mirrors or may be selected from a group consisting of an ellipsoidal and toroidally curved mirrors. The coupling surfaces may be planar surfaces which are inclined identically or varyingly. Also, they may be convexly or concavely curved surfaces. The device may also include additional mirrors adjacent each of the coupling surfaces so that the light entering and exiting the member is bent through approximately 90° and is thus a folded beam of light. The mirrors may be either flat mirrors or to aid in image correction may be convexly or concavely curved. It is conceivable to use both curved mirrors with curved coupling surfaces for the maximum image correction.

BRIEF DESCRIPTION OF THE DRAWINGS

FIG. 1 is a plan view of a device according to the present invention;

FIG. 2 is a partial side view taken in the direction of arrow A of a possible variation in the structure of the mirror of the device of FIG. 1;

FIG. 3 is a side view taken from direction A illustrating an embodiment of the transparent body utilized in FIG. 1;

FIG. 4 is a partial plan view of another embodiment of the construction of the mirror;

FIG. 5 is a partial plan view illustrating another embodiment of the construction of mirrors similar to the embodiment of FIG. 4;

FIG. 6 is a partial plan view illustrating an embodiment for the arrangement of the coupling surfaces and the diffraction grating;

FIG. 7 is a partial plan view illustrating another embodiment utilizing curved coupling surfaces;

FIG. 8 is a partial plan view of an embodiment having additional mirrors adjacent the coupling surfaces;

FIG. 9 is a partial plan view of an embodiment utilizing curved additional mirrors;

FIG. 10 is a partial plan view of an embodiment having additional mirrors and curved coupling surfaces.

DESCRIPTION OF THE PREFERRED EMBODIMENTS

Figure 11:
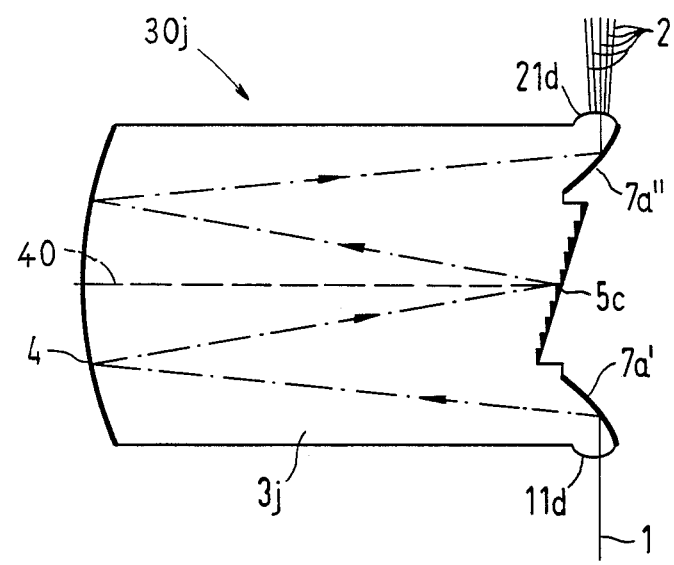
FIG. 11 is a plan view of a preferred embodiment of the device according to the present invention.

The principles of the present invention are particularly useful when incorporated in the device generally indicated at 30 in FIG. 1. The device 30 comprises a compact transparent member 3 which on one surface is provided with optical means such as a concave mirror 4 and opposite the mirror 4 is provided with a planar blazed grating 5 which is formed with a blazed grating technique. In addition, transparent body 3 is provided with first coupling surfaces 11 adjacent a diffraction grating 5 and second coupling surface 21. As illustrated, the grating is disposed therebetween. The first coupling surface 11 is coupled to a first waveguide 1 while the second coupling surface 21 is coupled to a group of second waveguides 2. Preferbly, in the above described embodiments, the waveguides 1 and 2 are optical fibers.

In the embodiment of FIG. 1, the diffraction grating 5 is not illustrated in an inclined position relative to the optical axis 40 of the mirror 4. In a practical body, however, the grating should be inclined to the optical axis 40 as illustrated by a grating 5a in FIG. 6 and by a grating 5c in FIG. 11.

In all of the illustrated embodiments, the body such as 3 can be formed by hot pressing of glass. Preferably, the blaze grating 5 can likewise be pressed into the glass member or body 3 or can be cemented on it in the form of a replica grating or a silicon grating. For the fiber reception or coupling, for example, the body can utilize a stepped interval or gradation which is disclosed in my U.S. Pat. No. 4,278,322, which is incorporated by reference thereto and was based on German application No. 28 28 802. As disclosed in my patent, a compound element of gradient lenses is utilized to form a stepped interval.

Preferably, the embodiment 30 is utilized as a demultiplexer so that light containing several wavelengths is supplied via the first waveguide 1 and the separated wavelengths are carried away by the fibers 2. If a plurality of beams are coupled into the device 30 through the waveguide fibers 2, then a multiplexed beam will be removed through the fiber 1 which will have a mixture of the wavelengths that were coupled in through the waveguides 2.

An embodiment of the device is generally indicated at 30a in FIG. 2 and this embodiment has a transparent body 3a provided with a mirror 4a which is doubly curved. The double curved mirror can be selected from a group of spherical and aspherical mirrors or may also be selected from a group consisting of ellipsoidally and toroidally curved mirrors.

Another embodiment is generally indicated at 30b in FIG. 3. In this embodiment, the mirror 4 is a simple cylindrical concave mirror such as the mirror in FIG. 1 but the transparent body 3b is composed of two glass members 3' and 3". In addition, the body 3b has a layer waveguide 3'''. The layer waveguide 3''' can be formed by either a thin glass plate which is sandwiched between the glass members 3' and 3" and has an index of refraction which is greater than the index of refraction of the members 3' and 3". It is also possible that the waveguide layer 3''' is formed by increasing the index of refraction of a layer portion of one of the members 3' or 3" by an ion exchange process.

Another embodiment is generally indicated 30c in FIG. 4 and has the glass body 3c provided with a mirror combination 4b which is composed of two concave cylindrical mirrors 4' and 4". As illustrated in the embodiment of FIG. 4, these are applied on the surface of the member 3c. In another embodiment generally indicated at 30d in FIG. 5, each of the individual concave cylindrical mirrors 4' and 4" are provided on the individual glass members which are subsequently cemented together and onto the transparent body 3d so that the body or member 3d is a composite member.

In the previous embodiments 30a–30d, we are concerned either with the construction of the body or glass member or with the mirrors. It is also possible to vary the structure of the glass member adjacent the diffraction grating and coupling surfaces as illustrated by the embodiments of FIGS. 6–10. In FIG. 6, an embodiment 30e is illustrated wherein the glass member 3e has the blaze grating 5a which is inclined to the optical axis 40 of the optical means. As previously mentioned, it is desirable in all cases for the blaze grating to be inclined in this manner in all embodiments.

In FIG. 7, a device generally indicated at 30f has a transparent member 3f which is provided with first and second coupling surfaces 11a and 21a which are curved surfaces which are important for image error correction. It is also possible that the surfaces may be inclined either identically or varyingly to the optical axis.

In another embodiment generally indicated at 30g in FIG. 8, the transparent member 3g is provided with additional mirrors 7' and 7". The mirror 7' cooperates with a coupling surface 11b so that light coming into the device 30g through the waveguide 1 will be bent through approximately 90° or folded. In a similar manner, the mirror 7" cooperates with the second coupling surface 21b so that outgoing light is folded or reflected through approximately a right angle prior to being coupled into the second waveguides 2. In this arrangement, the incoming and outgoing waveguides are to be flush with one another and the mirrors 7' and 7" may be totally reflecting or silvered mirrors or mirrors consisting of a dielectric multilayer.

In an embodiment of the device generally indicated at 30h in FIG. 9, the member or body 3h is provided with additional mirrors 7a' and 7a" which are curved and cooperate with the first and second coupling surfaces 11b and 21b. In another embodiment generally indicated at 30i in FIG. 10, the transparent body 3i utilizes curved coupling surfaces 11c and 21c with flat additional mirrors 7' and 7". In each of the embodiments 30g, 30h and 30i, the curving of the additional mirrors and/or the curving of the coupling surfaces enable image error correction. The curvature can be either convexly or concavely curved for the coupling surface.

A preferred embodiment of the present invention is generally indicated 30j in FIG. 11. Device 30j has a transparent member 3j which is provided with an optical means 4 which is a cylindrical mirror. The transparent member 3j in addition to having a blaze diffraction grating 5c which is inclined to an optical axis 40 of the optical means 4, includes a first coupling surface 11d which has a curved configuration and cooperates with a curved additional mirror 7a'. On a side of the body opposite the coupling surface 11d, the body has a second coupling surface 21d which is also curved and arranged with an additional mirror 7a" which is curved. The curvature of the surfaces helps correct image errors. The series of possibilities for image error corrections presents itself through the spatial separation of the incoming waveguide 1 and the outgoing waveguides 2.

In all illustrated embodiments of the glass member 3 without waveguides, the glass member is illustrated as a one-piece member. However, in practice, this member will primarily be composed of several partial members preferably cemented together. This is because the presently available technology of hot pressing of glass does not allow pressing all six surfaces of the glass member to the desired dimensions. Thus, only several lateral surfaces, in particular, opposite lateral surfaces, can be pressed in a hot pressing method. For this reason, several hot pressed members will be joined together to form the compact total member such as the member 3j of FIG. 11. However, it is pointed out that a one-piece member may be realized if additional improvements in the process of hot pressing methods occurs.

It should be noted that the embodiments illustrated in FIGS. 2 and 3 can be provided on the grating side with a construction similar to the embodiments illustrated in FIGS. 6-11 or to state this in another way, the embodiments of FIGS. 6-11 can have their transparent members constructed in a manner such as illustrated by the embodiments of FIGS. 2 or 3.

It should also be noted that the waveguides 1 and 2 instead of being fiber waveguides could be strip waveguides.

Significant advantages of the device of the present invention are as follows. The devices of the present invention allow the incoming fiber or waveguides and the outgoing fibers to be spatially separated which separation results in a simple waveguide adjustment and a series of possibilities for image error correction. In addition, the devices of the present invention provide a compact structure in spite of the spatial separation of the incoming waveguide or fibers relative to the outgoing waveguides or fibers. As mentioned hereinabove, while the description of the device emphasizes using the device as a demultiplexer, it also can function as a multiplexer.

Although various minor modifications may be suggested by those versed in the art, it should be understood that I wish to embody within the scope of the patent granted hereon, all such modifications as reasonably and properly come within the scope of my contribution to the art.

I claim:

1. An optical device selectively operated according to the diffraction grating principles as either a wavelength demultiplexer to separate light of different wavelengths into separate bands or as a wavelength multiplexer to multiplex light of different wavelengths into a single band, said device comprising a compact transparent member having a plurality of surfaces including at least a first surface, a second surface opposite the first surface, a third and fourth surface adjacent the second surface and separated thereby, a fifth surface adjacent the third surface and being separated from the second surface by the third surface and a sixth surface adjacent the fourth surface and being separated from the second surface by the fourth surface; optical means for forming imaging optics having an object space and an image space, said optical means including at least one concavely curved imaging mirror with an optical axis and being disposed on the first surface of the member; a diffraction grating being provided on the second surface of the said member opposite said imaging mirror and on said optical axis; first coupling means being provided on the fifth surface for coupling light between the member and a first optical waveguide; second coupling means being provided on the sixth surface for coupling a group of second waveguides to the member; and an additional mirror being disposed on each of the third and fourth surfaces for folding the light path in said transparent member immediately adjacent each of the first and second coupling means, said additional mirrors being totally reflecting mirrors applied directly on the third and fourth surfaces, said fifth surface being at the object space and the sixth surface being at the image space so that light entering either of the first and second coupling means is reflected by the additional mirror onto the optical means which reflects the light onto the diffraction grating which directs the light back at the optical means to be reflected at the other additional mirror, which reflects it to the other of the first and second coupling means to exit the device, and so that the diffraction grating when receiving a beam of more than one wavelength creates a reflection maxima for each of the wavelengths, which maximas are outside of the zero order of diffraction of the grating and are located at the individual second waveguides of the group of second waveguides and when receiving beams of different wavelengths combines the beams into a single beam of a plurality of wavelengths and directs the single beam to the single first waveguide.

2. An optical device according to claim 1, wherein the diffraction grating is a planar, blazed grating which is inclined relative to the optical axis of the optical means.

3. An optical device according to claim 2, wherein the blazed grating is formed in the second surface of the transparent member.

4. An optical device according to claim 2, wherein the blazed grating is provided in the form of either a replica grating or silicon grating and is secured on the second surface of the transparent member.

5. An optical device according to claim 2, wherein the transparent member with the blazed grating is a hot pressed glass body.

6. An optical device according to claim 1, wherein the curved mirror is a doubly curved mirror.

7. An optical device according to claim 6, wherein the doubly curved mirror is selected from a group of spherically and aspherical mirrors.

8. An optical device according to claim 6, wherein the curved mirror is selected from a group of ellipsoidal and toroidally curved mirrors.

9. An optical device according to claim 1, wherein the transparent member includes a layer waveguide extending from the one side to an opposite side and the concavely curved mirror is a cylindrical concave mirror.

10. An optical device according to claim 9, wherein the transparent member is composed of at least two glass members.

11. An optical device according to claim 10, wherein the layer waveguide comprises a thin glass plate having a higher index of refraction being interposed between the two glass members.

12. An optical device according to claim 10, wherein the waveguide layer comprises an ion exchange layer on one of the glass members and has a higher index of refraction than the index of refraction of said glass member.

13. An optical device according to claim 1, wherein each of the additional mirrors are plane mirrors.

14. An optical device according to claim 1, wherein each of the additional mirrors are curved mirrors to aid in image error correction.

15. An optical device according to claim 14, wherein the fifth and sixth surface are convexly curved surfaces.

16. An optical device according to claim 14, wherein the fifth and sixth surfaces are planar surfaces.

17. An optical device according to claim 1, wherein each of the third and fourth surfaces of the first and second coupling means is curved for the purpose of correcting image errors.

18. An optical device according to claim 1, wherein each of the fifth and sixth surfaces of the coupling means is a convexly curved surface for correcting image errors.

19. An optical device selectively operated according to the diffraction grating principles as either a wavelength demultiplexer to separate light of different wavelengths into separate bands or as a wavelength multiplexer to multiplex light of different wavelengths into a single band, said device comprising a compact transparent member having a plurality of surfaces including at least a first surface, a second surface opposite the first surface, a third and fourth surface adjacent the second surface and separated thereby, a fifth surface adjacent the third surface and being separated from the second surface by the third surface and a sixth surface adjacent the fourth surface and being separated from the second surface by the fourth surface; optical means for forming imaging optics having an object space and an image space, said optical means including at least one concavely curved imaging mirror with an optical axis and being disposed on the first surface of the member; a diffraction grating being provided on the second surface of the said member opposite said imaging mirror and on said optical axis; first coupling means being provided on the fifth surface for coupling light between the member and a first optical waveguide; second coupling means being provided on the sixth surface for coupling a group of second waveguides to the member; and an additional mirror being disposed on each of the third and fourth surfaces for folding the light path in said transparent member immediately adjacent each of the first and second coupling means, said additional mirrors being dielectric multilayer mirrors applied directly on the third an fourth surfaces, said fifth surface being at the object space and the sixth surface being at the image space so that light entering either of the first and second coupling means is reflected by the additional mirror onto the optical means which reflects the light onto the diffraction grating which directs the light back at the optical means to be reflected at the other additional mirror, which reflects it to the other of the first and second coupling means to exit the device, and so that the diffraction grating when receiving a beam of more than one wavelength creates a reflection maxima for each of the wavelengths, which maximas are outside of the zero order of diffraction of the grating and are located at the individual second waveguides of the group of second waveguides and when receiving beams of different wavelenghts combines the beams into a single beam of a plurality of wavelengths and directs the single beam to the single first waveguide.

20. An optical device according to claim 19, wherein each of the additional mirrors are curved mirrors to aid in image error correction.

21. An optical device according to claim 20, wherein the fifth and sixth surfaces of the coupling means are curved surfaces.

22. An optical device according to claim 20, wherein the fifth and sixth surfaces of the coupling means are planar surfaces.

23. An optical device according to claim 19, wherein each of the additional mirrors are plane mirrors.

24. An optical device according to claim 23, wherein each of the fifth and sixth surfaces of the coupling means is convexly for the purpose of correcting image errors.

25. An optical device according to claim 19, wherein each of the fifth and sixth surfaces of the coupling means is a convexly curved surface for correcting image errors.

26. An optical device according to claim 19, wherein the diffraction grating is a planar, blazed grating which is inclined relative to the optical axis of the optical means.

27. An optical device according to claim 26, wherein the blazed grating is formed in the second surface of the transparent member.

28. An optical device according to claim 26, wherein the blazed grating is provided in the form of either a replica grating or silicon grating and is secured on the second surface of the transparent member.

29. An optical device according to claim 26, wherein the transparent member with the blazed grating is a hot pressed glass body.

30. An optical device according to claim 19, wherein the curved imaging mirror is a doubly curved mirror.

31. An optical device according to claim 30, wherein the doubly curved mirror is selected from a group of spherically and aspherical mirrors.

32. An optical device according to claim 30, wherein the curved imaging mirror is selected from a group of ellipsoidal and torodially curved mirrors.

33. An optical device according to claim 19, wherein the transparent member includes a layer waveguide extending from the first surface to the second surface and the concavely curved imaging mirror is a cylindrical concave mirror.

34. A optical device according to claim 33, wherein the transparent member is composed of at least two glass members.

35. An optical device according to claim 34, wherein the layer waveguide comprises a thin glass plate having a higher index of refraction being interposed between the two glass members.

36. An optical device according to claim 34, wherein the waveguide layer comprises an ion exchange layer on one of the glass members and has a higher index of refraction than the index of refraction of said glass member.

* * * * *